April 23, 1935. F. D. FOWLER 1,998,866
METHOD AND APPARATUS FOR CALENDERING PLASTIC MATERIAL
Filed Nov. 15, 1933 2 Sheets-Sheet 1
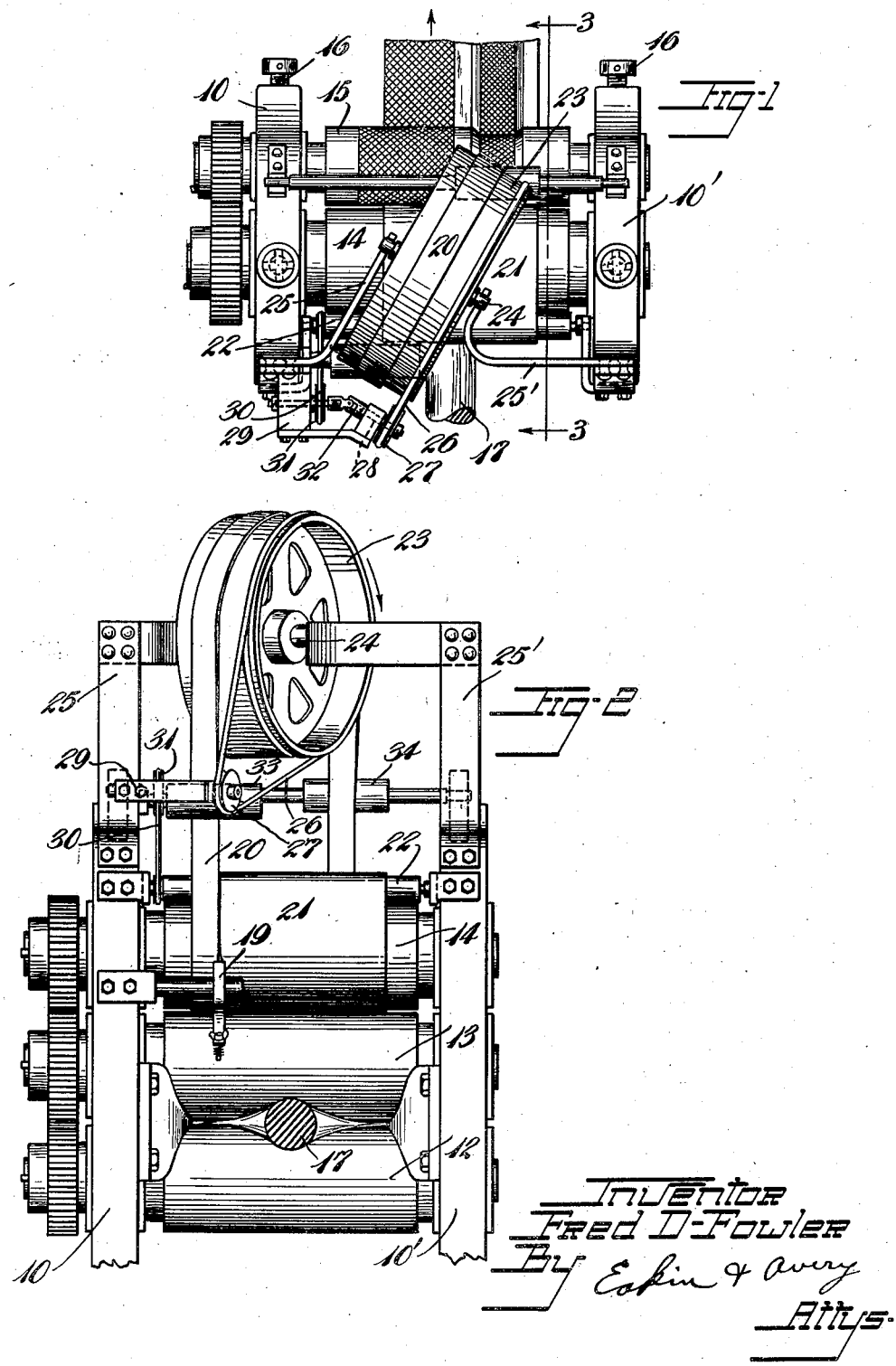
INVENTOR
Fred D. Fowler
By Eakin & Avery
Attys.

April 23, 1935.  F. D. FOWLER  1,998,866
METHOD AND APPARATUS FOR CALENDERING PLASTIC MATERIAL
Filed Nov. 15, 1933  2 Sheets-Sheet 2

Inventor
Fred D. Fowler
By Eakin & Avery
Attys.

Patented Apr. 23, 1935

1,998,866

UNITED STATES PATENT OFFICE 1,998,866

METHOD AND APPARATUS FOR CALENDERING PLASTIC MATERIAL

Fred D. Fowler, Newton, Mass., assignor to Hood Rubber Company, Inc., Watertown, Mass., a corporation of Delaware Application November 15, 1933, Serial No. 698,117

4 Claims. (Cl. 18—11)

This invention relates to methods and apparatus for calendering plastic material to produce a sheet or slab in which one longitudinal zone is thicker than another portion. The invention is especially useful in the production of sheet material for making shoe soles, tire treads, or other articles requiring a slab having longitudinal zones of different thicknesses.

Where it is desired to calender a mass of plastic material such as rubber to provide a strip having different thicknesses in different longitudinal zones, this may be done by providing the calender with a final pass defined by rolls one or more of which is circumferentially grooved or contoured to provide the desired shape. As the plastic material is usually supplied to the rolls in a sheet or slab of uniform thickness and the thicker part of the strip requires a greater supply of material in a given time than the thin part of the strip, difficulty is experienced in securing satisfactory results without overfeeding some portions of the bight of the rolls and thereby causing excess working and possibly prevulcanization of the material.

The principal objects of this invention are to provide a novel method of overcoming the aforesaid difficulties and to provide suitable apparatus therefor.

Other objects will appear from the following description and the accompanying drawings.

Of the drawings:

Fig. 1 is a plan view of a preferred form of apparatus embodying the invention.

Fig. 2 is a front elevation thereof, the lower part of the frame being broken away.

Figure 3:
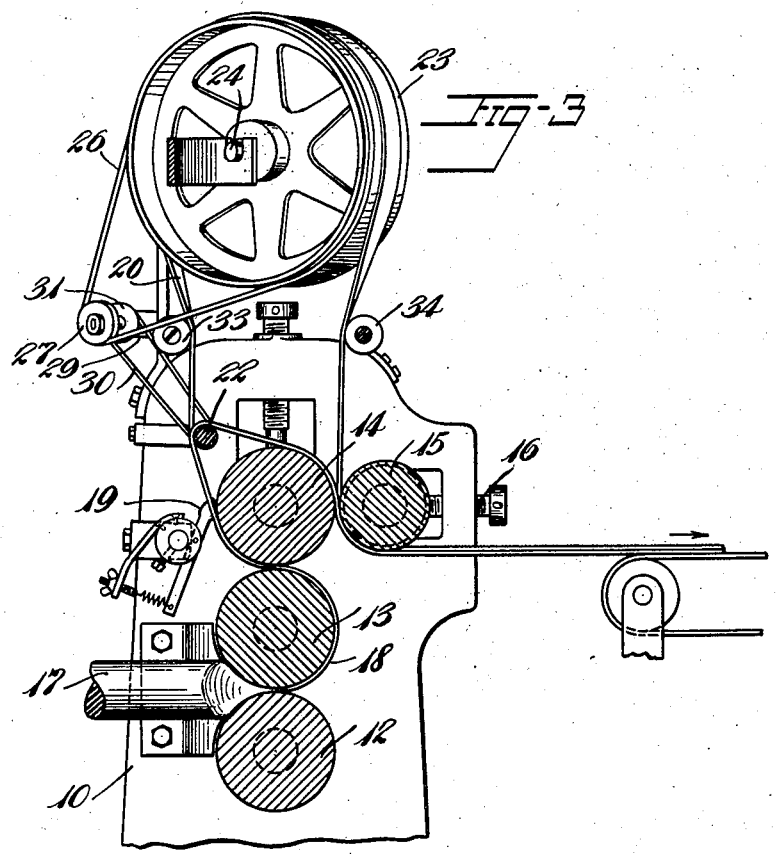
Fig. 3 is a sectional view taken on line 3—3 of Fig. 1.

Referring to the drawings, the numerals 10, 10′ designate the side frame members of a calender adapted to form a plastic rubber mass into sheet or slab form. The frame members are provided with journal boxes in which are rotatably mounted in parallelism a series of calender rolls 12, 13, 14 and 15. Rolls 12, 13 and 14 are of the usual construction with plain faces. Means (not shown) are provided for circulating water and steam through the rolls, which are hollow, for regulating the temperature thereof.

Roll 13 is mounted to rotate in bearings fixed to the frame members, whereas the rolls 12 and 14 are mounted in bearing boxes adjustable toward and from roll 13 to regulate the space between the rolls.

Roll 15 is similarly adjustable toward and from roll 14, screws 16 being provided for making the adjustment. Roll 15 is contoured or formed with a circumferential groove for forming the thick zone of the slab.

The plastic material 17, which has been previously warmed, is entered between rolls 12 and 13 where it assumes the form of a sheet 18. This sheet passes around roll 13 and between rolls 13 and 14 where it is further rolled to size.

As the sheet 18 passes roll 14, a spring pressed knife 19 mounted upon the frame of the machine rests against roll 14 and divides or slits the sheet into a narrow strip 20 and a wide strip 21. Strip 21 proceeds around an idler roll 22 and between rolls 14 and 15.

The strip 20 is conveyed to the bight of rolls 14 and 15 where it is superimposed upon strip 21 at the grooved portion of roll 15. For this purpose a drum 23 mounted on a shaft 24 is rotatably mounted on brackets 25, 25′ extending from the frame members above the calender. Drum 23 is driven by a belt 26 from a pulley 27. Pulley 27 is mounted on a shaft 28, journaled in a bracket 29 on the machine frame. It is driven from roller 22 by a belt 30 which drives a pulley 31, pulleys 27 and 31 being connected by a universal joint 32. The drive may be omitted if desired and the drum 23 driven by the stock. The arrangement is such that the strips are laterally rearranged in proportion to the usage of rubber along the face of the rolls.

Idler rolls 33 and 34 are provided to guide the strip 20.

Figure 4:
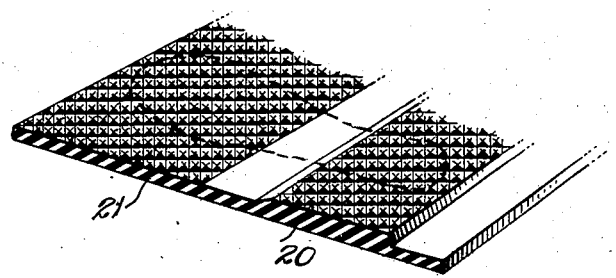
Fig. 4 is a perspective view of part of a finished slab of rubber.

The strips 20 and 21 supply the necessary amount of rubber properly distributed to supply the bight of rolls 14, 15, where the slab illustrated in Fig. 4 is formed. Roll 15 may be knurled or otherwise engraved to produce a pattern on the face of the slab.

I claim:

1. Apparatus for forming a slab of plastic material of non-uniform cross-section, said apparatus comprising a pair of forming rolls adapted to roll the desired section, and feeding means for supplying plastic material thereto in strip form, said feeding means comprising a sheet forming roll directly cooperating with one of the forming rolls, a cutter cooperating therewith to slit the sheet into strips, and delivery means to supply one strip of material of narrow width in superimposed relation to another strip of greater width thereby to supply more material at a position requiring greater supply.

2. Apparatus for forming a slab of plastic material of non-uniform cross section, said apparatus comprising a pair of forming rolls adapted to roll the desired section, and means for feeding a supply of plastic material thereto, said means including a pair of calender rolls directly cooperating with one of the forming rolls for forming a sheet of material, cutting means cooperating therewith to slit the sheet into strips, and means for so delivering the strips to the forming rolls as to supply material at different positions along the bight of the rolls in proportion to the volume consumed at each position.

3. Apparatus for forming a slab of plastic material of non-uniform cross-section, said apparatus comprising a pair of forming rolls adapted to roll the desired section, and means for feeding a supply of plastic material thereto, said means including a pair of calender rolls for forming a sheet of material of uniform thickness, a cutter cooperating with one of the rolls to slit said sheet to form a wide strip and a narrow strip, means for leading the wide strip to the bight of the forming rolls, and means for conveying the narrow strip to the bight of the forming rolls in superimposed relation to the wide strip.

4. The method of forming a slab of plastic material of non-uniform cross section which comprises calendering a sheet of plastic material, slitting the sheet to provide a narrow strip and a wide strip, advancing the strips while arranging them in juxtaposed relation, and rolling the assembled strips to form the desired slab.

FRED D. FOWLER.